US008371198B2

(12) United States Patent
Babine

(10) Patent No.: US 8,371,198 B2
(45) Date of Patent: Feb. 12, 2013

(54) TABLE SAW FENCE ENGAGEMENT AND BLADE GUARD APPARATUS

(76) Inventor: Joseph Babine, Santa Barbara, CA (US)

( * ) Notice: Subject to any disclaimer, the term of this patent is extended or adjusted under 35 U.S.C. 154(b) by 744 days.

(21) Appl. No.: 12/544,864

(22) Filed: Aug. 20, 2009

(65) Prior Publication Data

US 2011/0041664 A1 Feb. 24, 2011

(51) Int. Cl.
*B27B 11/02* (2006.01)
*B27B 11/04* (2006.01)
*B27B 13/10* (2006.01)
*B23D 19/00* (2006.01)

(52) U.S. Cl. ............................ 83/441.1; 83/447; 83/450

(58) Field of Classification Search .................... 83/422, 83/441.1, 446–448, 450, 477.2; 403/300, 403/312, 306, 362; 248/121–122, 124.1, 248/158, 370, 424, 176.1
See application file for complete search history.

(56) References Cited

U.S. PATENT DOCUMENTS

| | | | | | |
|---|---|---|---|---|---|
| 1,067,360 | A | | 7/1913 | McSorley et al. | |
| 1,271,473 | A | | 7/1918 | Johnson | |
| 1,340,414 | A | * | 5/1920 | Schneider | 280/442 |
| 1,744,875 | A | * | 1/1930 | Edwards | 144/250.13 |
| 2,679,871 | A | * | 6/1954 | Ford | 144/250.13 |
| 2,801,656 | A | * | 8/1957 | Ford | 144/250.13 |
| 2,817,376 | A | * | 12/1957 | Johannsen | 144/250.13 |
| 2,829,683 | A | * | 4/1958 | Skinner et al. | 83/718 |
| 3,209,709 | A | * | 10/1965 | Shoffner | 108/27 |
| 3,252,713 | A | * | 5/1966 | Heller | 280/87.042 |
| 3,568,738 | A | | 3/1971 | Thrasher | |
| 3,738,403 | A | | 6/1973 | Schwoch et al. | |
| 4,037,831 | A | * | 7/1977 | Johnson | 269/306 |
| 4,118,268 | A | * | 10/1978 | Price | 156/510 |
| 4,403,534 | A | | 9/1983 | Altendorf et al. | |
| 4,469,318 | A | * | 9/1984 | Slavic | 269/91 |
| 4,499,933 | A | | 2/1985 | Thompson | |
| 4,531,438 | A | * | 7/1985 | Pair | 83/156 |
| 4,786,062 | A | * | 11/1988 | Schneider | 279/83 |
| 1,976,298 | A | | 12/1990 | Gibson | |
| 4,976,298 | A | * | 12/1990 | Gibson | 144/250.15 |
| 5,058,474 | A | | 10/1991 | Herrera | |
| 5,148,846 | A | | 9/1992 | Van Gelder | |
| 5,263,725 | A | * | 11/1993 | Gesmer et al. | 280/11.28 |
| 5,297,888 | A | * | 3/1994 | Nehls | 403/306 |
| 5,301,726 | A | * | 4/1994 | Wojcik | 144/253.2 |
| 6,446,687 | B1 | * | 9/2002 | Jukoff | 144/253.6 |
| 6,568,441 | B2 | | 5/2003 | Jones | |
| 6,619,347 | B2 | * | 9/2003 | Jukoff et al. | 144/253.6 |
| 7,245,981 | B2 | | 7/2007 | Dick et al. | |
| 2006/0201297 | A1 | | 9/2006 | Friend | |

FOREIGN PATENT DOCUMENTS

| | | |
|---|---|---|
| JP | 11-19902 | 1/1999 |

* cited by examiner

*Primary Examiner* — Ghassem Alie
*Assistant Examiner* — Bharat C Patel
(74) *Attorney, Agent, or Firm* — Felix L. Fischer

(57) ABSTRACT

A fence engagement and blade guard includes a column mounted to a table saw with a horizontal member received in a channel in the column. A vertical rod extends through and is vertically adjustable in a hole in the horizontal member. An engagement cart is suspended from the vertical rod and includes a beam having axle apertures and axles received in the apertures to support wheels. The wheels frictionally engage a work piece. An axle suspension system is supported from a shield. The engagement cart is angularly rotatable for engagement of the wheels on the work piece to directionally urge the work piece against the table saw fence.

5 Claims, 6 Drawing Sheets

TABLE SAW FENCE ENGAGEMENT AND BLADE GUARD APPARATUS

BACKGROUND INFORMATION

1. Field

Embodiments of the disclosure relate generally to the field of wood working saw tooling and more particularly to embodiments for an integrated hold down device for engagement of a work piece with a table saw fence and providing a blade guard.

2. Background

Table saws typically provide a fence against which the work piece rests to allow a straight cut to be achieved. However, for various conditions the work piece may tend to drift from the fence or be pushed upwards away from the saw table. Particularly with thin, narrow, or small work pieces, retaining the work piece against the fence using only the operator's hands may place the fingers or hands dangerously close to the blade. Additionally, the need for handling a wide variety of widths and thicknesses of work pieces for which the saw may be capable requires any assistance tooling to be highly adjustable and various surface contour or roughness of the work pieces requires flexible contact with the work piece surface. Further, particularly with smaller work pieces, there is a likelihood for expulsion of splinters or debris from the blade during cutting. Ease of deployment and adjustability are essential qualities in such a device; history has shown that an otherwise effective hold down/blade guard device will be discarded by the user if it cannot be quickly adapted to changing uses, leaving the operator with no safety device at all.

It is therefore desirable to provide a highly adjustable device to assist in retaining the work piece against the fence and the saw table to assure a clean and straight cut. Additionally, it is desirable that such a device accommodate various surface contours or roughness of the work piece. It is also desirable to provide a guard to intercept ejected splinters or debris from the saw blade and work piece that might create a hazard for the operator. It is further desirable that the device be quickly and easily adjustable to encourage its consistent use as a safety device.

SUMMARY

Exemplary embodiments provide a fence engagement and blade guard which includes a column mounted to a table saw with a horizontal member received in a channel in the column and adjustably extending therefrom. A vertical rod extends through and is vertically adjustable in a hole in the horizontal member distal from the column. An engagement cart is suspended from the vertical rod and includes a beam having axle apertures and axles received in the apertures to support wheels. The wheels frictionally engage a work piece. An axle suspension system is provided which also supports a shield. The engagement cart is angularly rotatable for engagement of the wheels on the work piece to directionally urge the work piece against the table saw fence.

In exemplary embodiments, the column is rectangular and a mounting plate having a mating rectangular relief receives the column to inhibit rotation. The mounting plate is affixed to a fence structure of the table saw. In such exemplary embodiments, the horizontal member is rectangular and the receiving channel is rectangular and the vertical rod is cylindrical. Rotation of the rod within the hole provides for angular rotation of the engagement cart.

In one implementation of the exemplary embodiment, indicia on the horizontal member and vertical rod for predetermined length of extension of the horizontal member from the column and predetermined vertical height within the hole of the horizontal member.

In the exemplary embodiments, the suspension system is implemented with each axle aperture vertically elongated and an axle nut is mounted to the beam and constrains a pin extending through a port in the axle and received in a notch in the beam. A resilient member urges the axle downwardly within the axle aperture. For the exemplary embodiments, the axle nut has a threaded nipple received in a threaded hole in the beam centered over the axle aperture and an alignment bore with a cup receiving the pin and the resilient member is a spring concentric with the pin and captured within the alignment bore of the axle nut. The spring is constrained between a shoulder of the alignment bore and the axle. A transparent acrylic shield is supported from the axle nuts.

In another implementation of the exemplary embodiments, the port in the axle is dual tapered for angular play of the pin to allow rotation of the axle and each axle incorporates vertical flat surfaces on an engagement portion received within the axle aperture, the aperture having associated flats to constrain rotation of the axle to a vertical plane.

The features, functions, and advantages that have been discussed can be achieved independently in various embodiments of the present invention or may be combined in yet other embodiments further details of which can be seen with reference to the following description and drawings

DETAILED DESCRIPTION

The embodiments described herein disclose a device mountable to a table saw which urges a work piece against the table saw fence to enhance alignment and provides a guard over the blade for operator protection.

Figure 1:
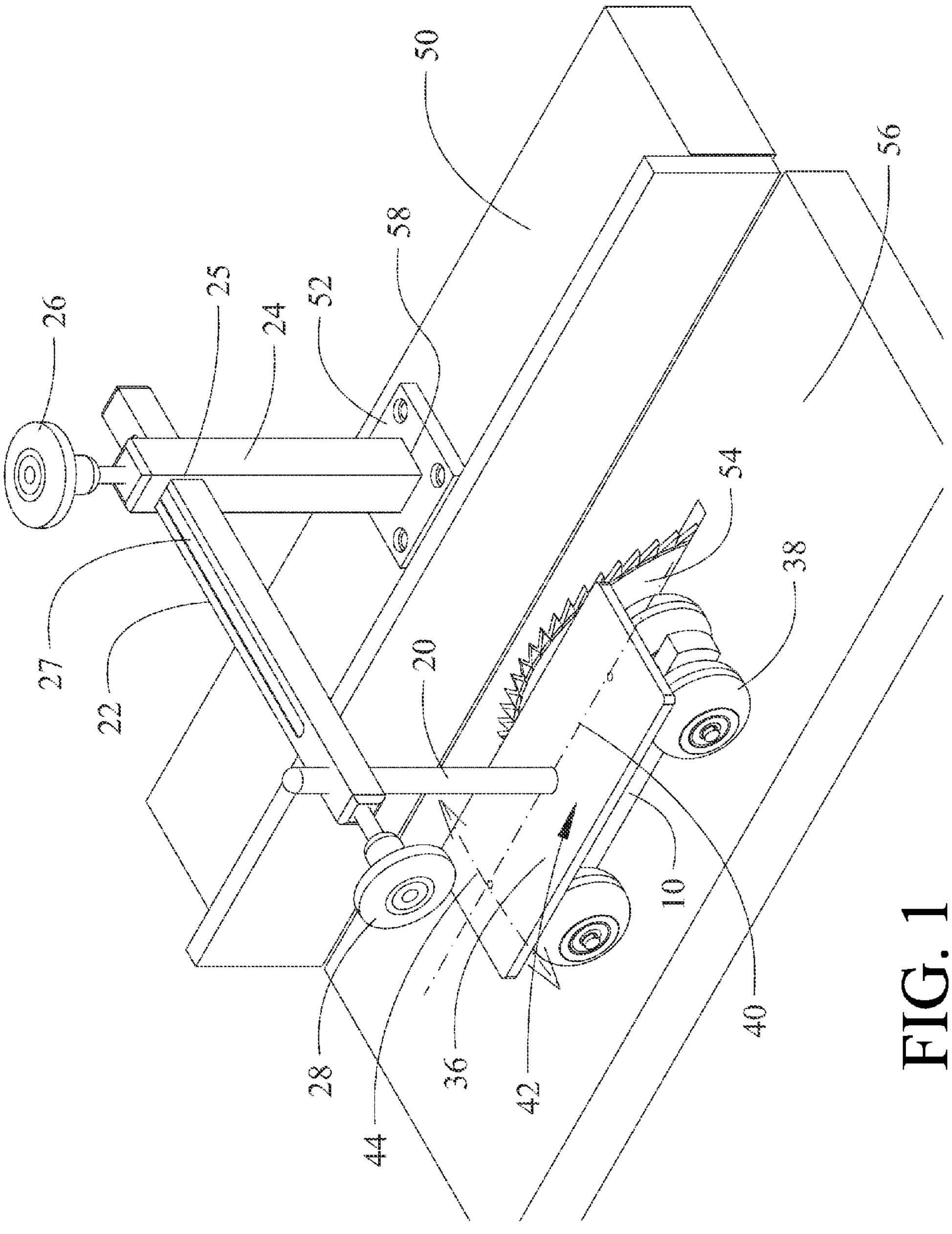
FIG. 1 is an isometric view of an exemplary embodiment.
Figure 2:
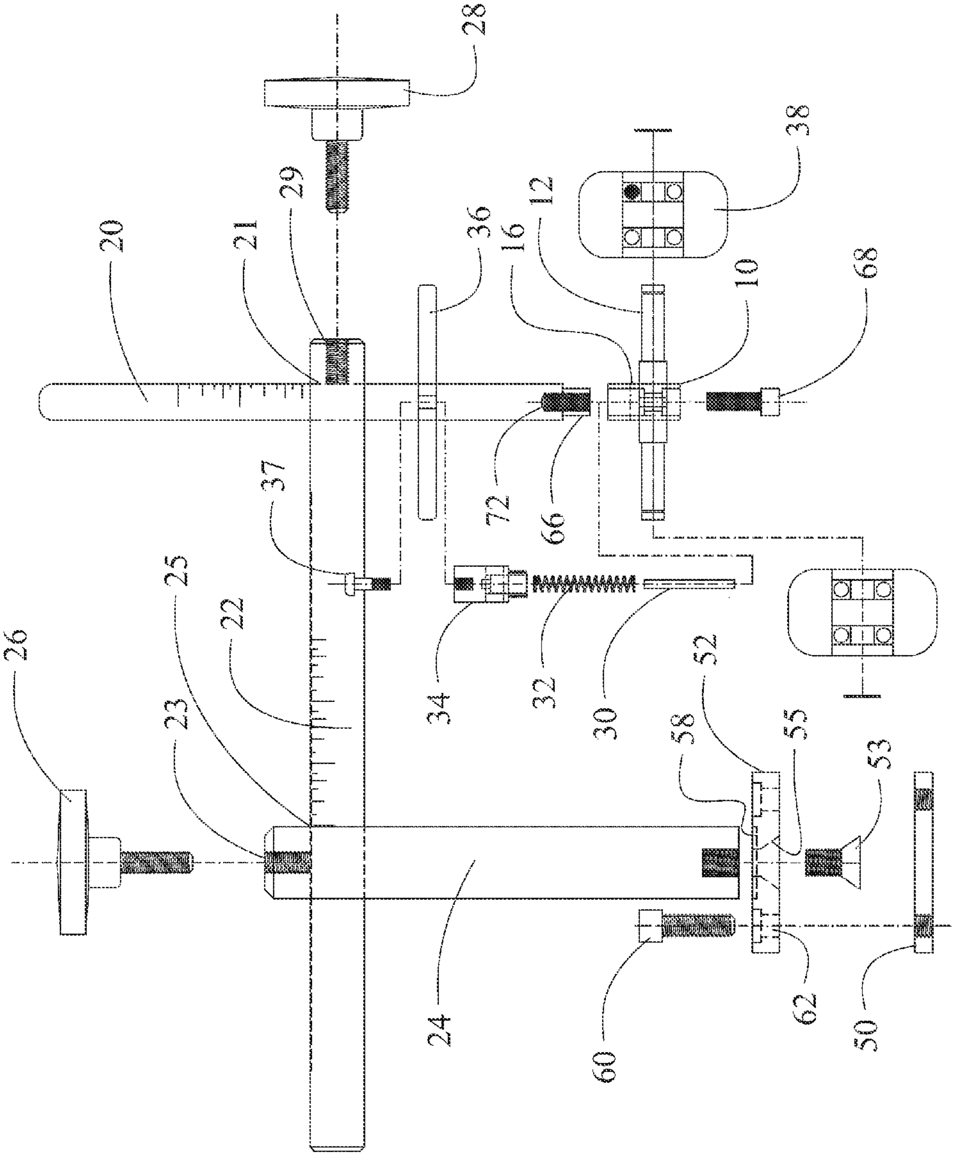
FIG. 2 is an exploded end section view of the embodiment of FIG. 1.
Figure 3:
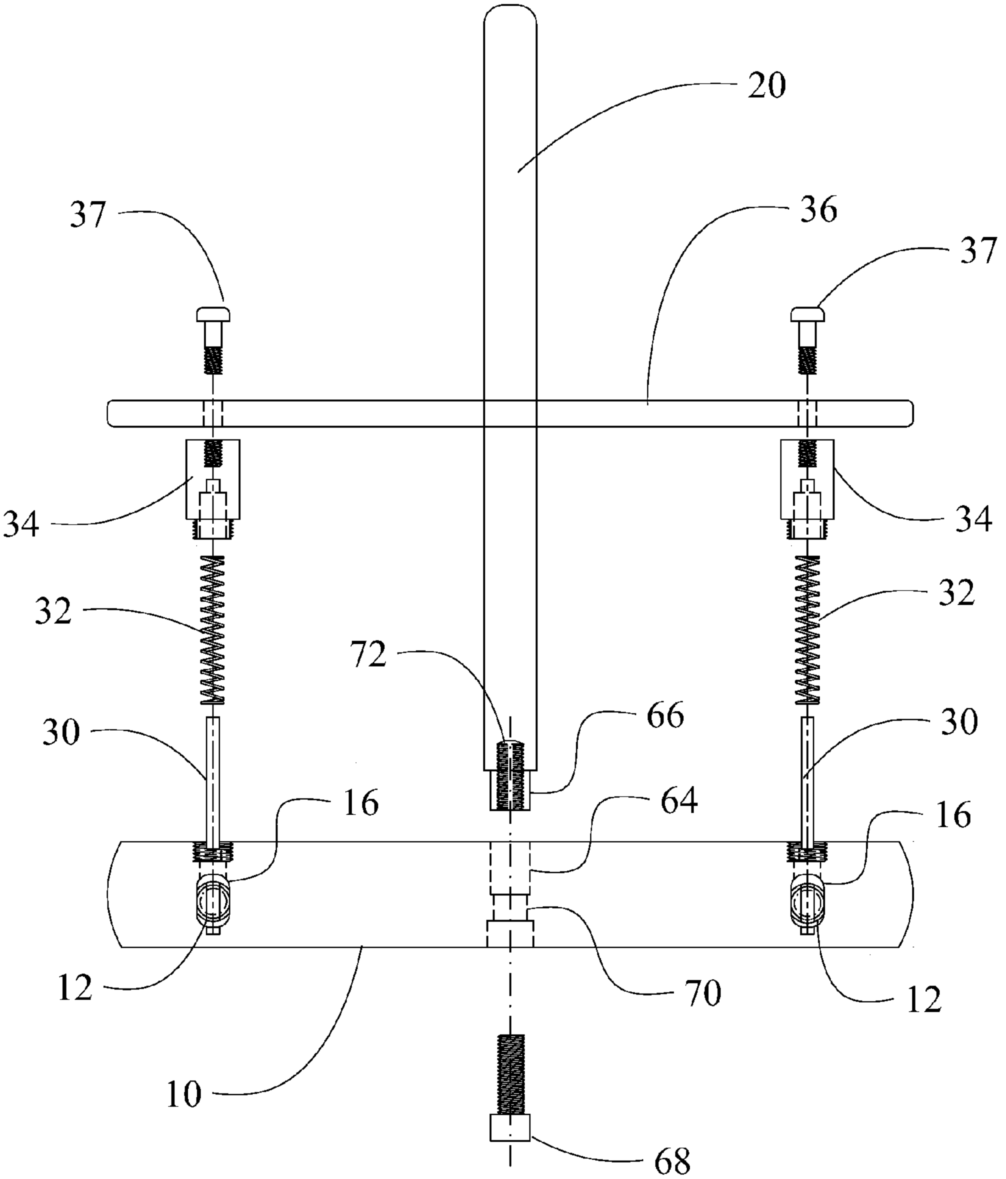
FIG. 3 is an exploded side section view of the rod, beam, shield and attachment elements of the embodiment of FIG. 1.

An isometric view of an embodiment incorporating the present invention is shown in FIGS. 1, 2 and 3. The "rip-aid" device comprises a support beam 10 with two axles 12 which extend substantially perpendicular to the beam through elongated apertures 16. The support beam is mounted to a vertical rod 20 which extends through a hole 21 in a horizontal member 22. The horizontal member is supported by a column 24 which is rigidly mounted to a saw table, specifically the fence structure 50 for the embodiment shown as will be described in greater detail subsequently. The horizontal member is received through a rectangular channel 25 in column 24 is adjustable for length in a horizontal direction with a locking knob 26 having a screw extending through a threaded bore 23 extending through the column top to the rectangular channel to engage the horizontal member. For the embodiment shown, a tracking groove 27 provides enhanced engagement of the locking knob screw with the horizontal member and prevents metal upset, which may potentially be created due to multiple adjustments, from affecting the clearance of the sliding part. To accommodate various thicknesses of work pieces, the vertical rod 20 is adjustable for defining vertical height of the beam with a locking knob 28 having a screw extending through a threaded bore 29 in an outboard end of the horizontal member to the hole 21.

As seen in FIGS. 2 and 3, the axles 12 are resiliently restrained in the elongated holes with a pin 30, spring 32 and axle nut 34 as will be described in greater detail subsequently. Each axle nut is attached to the beam and a horizontal shield 36 which may be a clear acrylic or other tough transparent material to allow the operator to view the saw blade and work piece. For the embodiment shown, cap screws 37 inserted through holes 39 in the shield are employed for attachment of the shield. Wheels 38 are supported by the axles. The wheels are molded from high friction materials such that angular "toeing" of the beam and wheels with respect to the table saw fence urges a work piece contacting the wheels against the fence while transitioning under the device. For an exemplary embodiment, polyurethane wheels with a Durometer of approximately 98 A are employed. Softer Durometer in the range of 75 A-90 A may be employed in alternative embodiments for "stickier" wheels for applications with smooth work pieces where higher friction may be required to achieve the desired lateral force created by the toeing of the beam.

The angle of the beam and associated axles and wheels relative to the fence is adjustable by rotating the vertical rod 20 within the hole 21 in the horizontal member 22 and securing the locking knob 28. Longitudinal axis 40 of the work piece engagement cart 42 formed by the beam 10, axles 12 and shield 36 may be swept through any desired angle of arc 44 to achieve the desired resistance. Typically a small angular displacement of 3° to 5° is all that is required. Rod 20 may be dimpled to provide specific vertical and rotational engagement detents for the locking knob to allow predetermined height and angular settings. However, in alternative embodiments, the rod may be smooth or provide smooth sections for infinite adjustment. Etched scales on the vertical rod and horizontal member may be employed to precise and repeatable positioning. The dimples, scales or other positioning indicia may be employed on one or both of the horizontal member and rod.

As shown for the embodiment in FIGS. 1 and 2, the column 24 is mounted to the table saw fence structure 50 with a mounting plate 52. In the exemplary embodiment, the mounting plate is affixed to the column with a flush mounted flat head screw 53 received in an aperture 55. A securing rectangular relief 58 in the mounting block receives the column end to prevent rotation in the mounting plate. The mounting plate is affixed to the saw fence using screws 60 received through mounting holes 62. The mounting plate provides a sufficient footprint for securely and rigidly mounting the column to the fence while reducing the required size for the column itself.

In FIG. 1, to clearly show relative positioning of all components of the system, the saw blade 54 is shown in an elevated position extending through the saw table 56 with the engagement cart 42 adjusted outboard with the horizontal column 22. In most cutting applications, the blade is retracted to clear the work piece thickness only, permitting the engagement cart to be positioned directly adjacent the blade thereby allowing the shield to entirely cover the blade arc protruding through the work piece. In alternative embodiments where large work pieces are anticipated, the width and length of the shield can be increased as necessary to provide adequate coverage of the blade.

Figure 4:
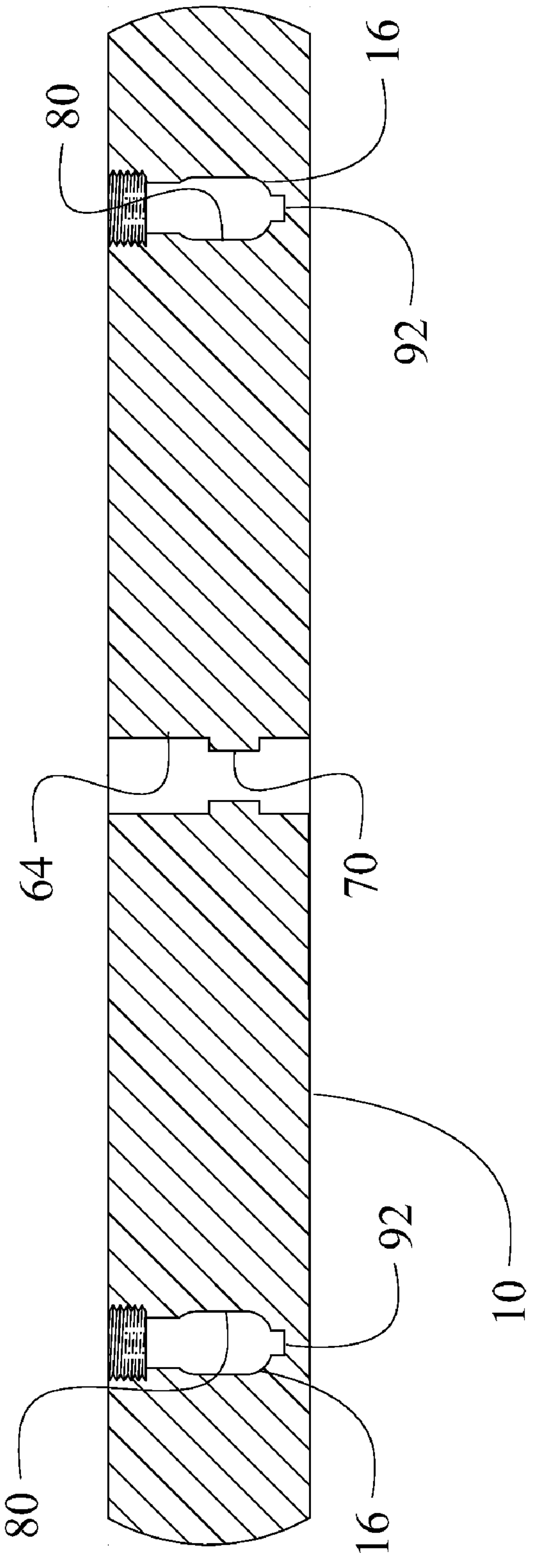
FIG. 4 is a side section view of the beam.
Figure 6C:
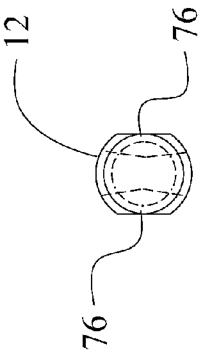
FIGS. 6A-6C are side, top and end views of one axle.
Figure 6A:
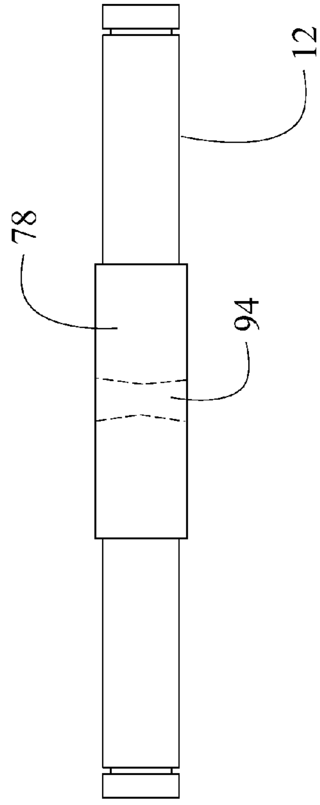
Figure 6B:
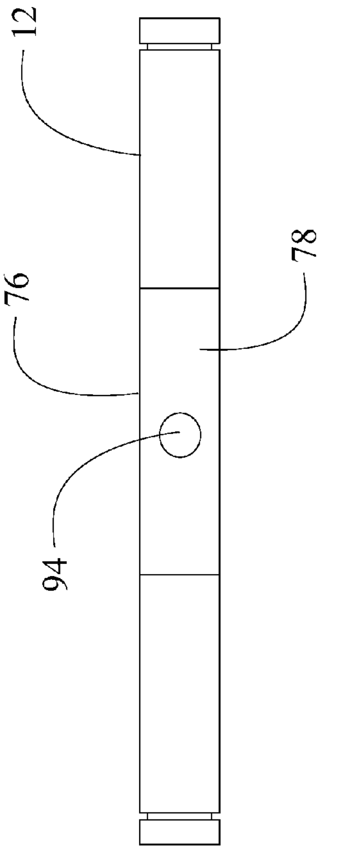

Suspension of both the leading and trailing axles in the support beam 10 of the engagement cart 42 allows the apparatus to be employed with work pieces having substantial texture or roughness without impacting the performance of the device. A shown in FIGS. 3 and 4, support beam 10 incorporates a positioning bore 64 which receives a shouldered end 66 of vertical rod 20. For the embodiment shown, the beam is secured to the rod with a screw 68 received in recessed bore 70 extending through the beam into bore 64. The screw is secured in threaded bore 72 in the rod end. This mounting structure provides a rigid attachment of the rod and beam which contributes to overall rigidity of the device as a whole. To provide axle suspension, the apertures 16 which receive the axles are elliptically elongated for vertical relief. Axles 12 provide vertical flat surfaces 76 on an engagement portion 78 of the axles (as best seen in FIGS. 6A-C) which is received within elongated the apertures 16. The elongated apertures have matching vertical flats 80 to limit travel of the axles to vertical displacement.

Figure 5:
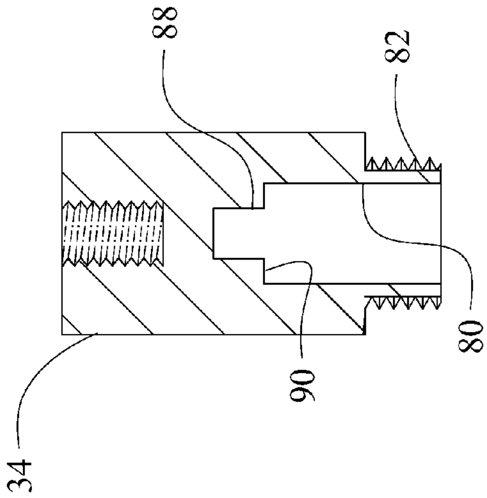
FIG. 5 is a side section view of the beam attachment nut.
Figure 8:
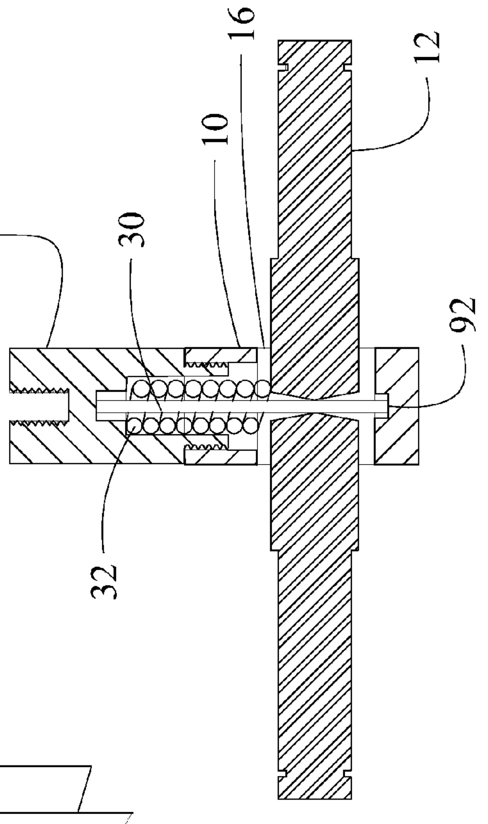
FIG. 8 is an end section view of the beam and axle assembly.
Figure 7:
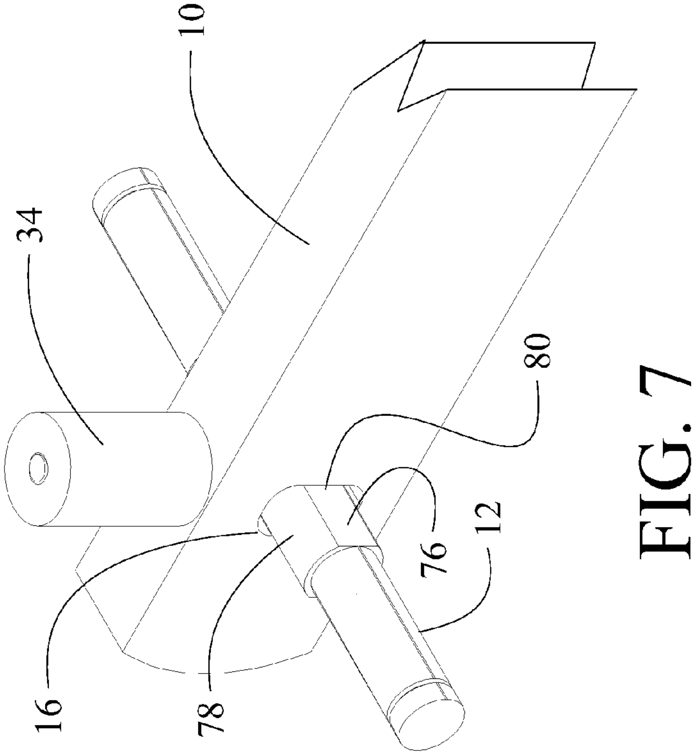
FIG. 7 is an isometric partial view of the beam and axle assembly.

The suspension for the engagement cart employs axle nut 34 to center and restrain the support pin 30 and spring 32. The axle nut incorporates a threaded nipple 82 (best seen in FIG. 5) which is received in threaded holes 84 in the beam 10 centered over the axle aperture 16 as shown in FIGS. 7 and 8. An alignment bore 86 in the bottom of axle nut 34 with a cup 88 receive the spring 32 and pin 30 respectively. Shoulder 90 of the alignment bore engages the spring to urge the spring against the top surface of the engagement portion 78 of the axles. Pin 30, captured in the cup 88 and an aligned notch 92 in the base of the axle aperture 16 in the beam, extends through port 94 in each axle (shown in FIGS. 6A-C) to center and constrain the axle. As seen in FIGS. 6A-C, port 94 has a dual taper allowing angular play by the axle with respect to the pin 30. The flat surfaces 76 on each axle engaging the associated flats 80 in the axle apertures 16 constrain the axle rotation to a vertical plane. As shown in FIGS. 7 and 8, the axle 12 floats in the elongated axle aperture 16, urged downward by spring 32 and upward based on engagement of the wheel with the work piece, while pin 30 maintains the centered position of the axle within the axle aperture. In addition to allowing the engagement cart to responsively yield to rough or uneven work pieces, the resilient suspension urges the work piece downward onto the saw table while the toe-in frictional engagement of the wheels on the engagement cart urge the work piece against the fence thereby providing maximum control of the work piece during cutting.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A fence engagement and blade guard a comprising:

a column mounted to a table saw;

a horizontal member received in a channel in the column and adjustably extending therefrom;

a vertical rod extending through and vertically adjustable in a hole in the horizontal member distal from the column: and, an engagement cart suspended from the vertical rod and including a beam having vertically at least two elongated axle apertures, at least two axles received in the apertures, an axle suspension system supporting a shield, said axle suspension system having an axle nut with a threaded nipple received in a threaded hole in the beam centered over the axle aperture and an alignment bore with a cup receiving a pin extending through a port in the axle and received in a notch in the beam, wherein each axle incorporates vertical flat surfaces on an engagement portion received within the axle aperture, said axle aperture having associated flats to constrain rotation of the axle to a vertical plane and said port in the axle is dual tapered for angular play of the pin for rotation of the axle;

at least one wheel supported by each of said axles, said wheel frictionally engaging a work piece, and, a spring concentric with the pin and captured within the alignment bore of the axle nut, said spring constrained between a shoulder of the alignment bore and each axle urging the axle downwardly within the axle apertures, said engagement cart angularly rotatable for engagement of the wheels on the work piece to directionally urges the work piece.

2. The fence engagement and blade guard as defined in claim 1 wherein the column is rectangular and further comprising a mounting plate having a mating rectangular relief receiving the column to inhibit rotation, said mounting plate affixed to a fence structure of the table saw.

3. The fence engagement and blade guard as defined in claim 1 wherein the horizontal member is rectangular and the receiving channel is rectangular.

4. The fence engagement and blade guard as defined in claim 1 wherein the vertical rod is cylindrical and rotation of the rod within the hole provides for angular rotation of the engagement cart.

5. The fence engagement and blade guard as defined in claim 1 further comprising indicia on the horizontal member and vertical rod for predetermined length of extension of the horizontal member from the column and predetermined vertical height within the hole of the horizontal member.

* * * * *